United States Patent
Amro et al.

(10) Patent No.: US 6,909,439 B1
(45) Date of Patent: Jun. 21, 2005

(54) METHOD AND APPARATUS FOR MAXIMIZING EFFICIENCY OF SMALL DISPLAY IN A DATA PROCESSING SYSTEM

(75) Inventors: Hatim Yousef Amro, Austin, TX (US); John Paul Dodson, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,738

(22) Filed: Aug. 26, 1999

(51) Int. Cl.[7] .............................. G09G 5/00; G06F 3/00
(52) U.S. Cl. ...................................... 345/660; 715/764
(58) Field of Search ................................ 345/660–671, 345/156–157, 349, 619, 800, 798, 801; 715/764–765, 967; 382/298, 299, 300

(56) References Cited

U.S. PATENT DOCUMENTS

| | | | |
|---|---|---|---|
| 5,227,771 A | * 7/1993 | Kerr et al. | 345/660 |
| 5,559,942 A | * 9/1996 | Gough et al. | 345/802 |
| 5,682,487 A | 10/1997 | Thomson | 395/342 |
| 5,689,666 A | 11/1997 | Berquist et al. | 395/345 |
| 5,696,914 A | * 12/1997 | Nahaboo et al. | 345/619 |
| 5,742,779 A | * 4/1998 | Steele et al. | 345/839 |
| 5,784,067 A | * 7/1998 | Ryll et al. | 345/440 |
| 5,790,118 A | 8/1998 | Bertram | 345/339 |
| 5,848,373 A | 12/1998 | DeLorme et al. | 701/200 |
| 5,859,628 A | 1/1999 | Ross et al. | 345/173 |
| 5,873,108 A | 2/1999 | Goyal et al. | 707/507 |

OTHER PUBLICATIONS

Perlin et al, Nested User Interface Components, NYU media Research Lab Department of Computer Science, Proceedings of the 12th Annual ACM Symposium on User Interface Software and Technology, Nov. 7–10, 1999, Asheville, USA. ACM, pp. 11–18.*

* cited by examiner

Primary Examiner—Matthew C. Bella
Assistant Examiner—Anthony Blackman
(74) Attorney, Agent, or Firm—Duke W. Yee; Daniel E. McConnell; Wing Y. Mok

(57) ABSTRACT

A method and apparatus in a data processing system for processing user input. A graphical widget is displayed on a display device within the data processing system, wherein the graphical widget is displayed using a first size. Responsive to receiving a selected user input, a display of the graphical widget is resized on the display device to a second size for receiving user input, wherein the second size is larger than the first size.

28 Claims, 4 Drawing Sheets

METHOD AND APPARATUS FOR MAXIMIZING EFFICIENCY OF SMALL DISPLAY IN A DATA PROCESSING SYSTEM

BACKGROUND OF THE INVENTION

1. Technical Field

The present invention relates generally to an improved data processing system and, in particular, to a method and apparatus for maximizing efficiency of a small display in a data processing system. Still more particularly, the present invention relates to a method and apparatus for displaying data and receiving input on a display in a data processing system.

2. Description of Related Art

The manipulation of data in a computer is well known in the prior art. Data may be manipulated in many ways in a modern state of the art computer including: data accessing, data encoding, data communications, data compression, data conversion, data entry, data exchange, data filing, data linking, data locking, data mapping, data modeling, data processing, data recording, data sorting, and data transferring. The large amounts of data that are available to the user of a modern state of the art computer often become overwhelming in magnitude and complexity. In providing an interface between a user and a computer, the use of a graphical user interface (GUI) provides an intuitive and graphical interface between the user and a computer. A GUI is an interface system, by which a user interacts with a computer through windows or view ports, icons, menus, pointing devices, etc.

Although the use of GUIs has made the manipulation of data easier for users in some instances, GUIs have created new problems especially in different types of computers. For example, pen-based or pen-aware computer systems are becoming more common place. These computer systems, also referred to as personal digital assistant or hand held computers, are often housed in a relatively flat enclosure in which the display assembly functions both as an input device and an output device. When operating as an input device, the display assembly senses the position of the tip of a stylus on the viewing screen and provides this positional information to the computer's central processing unit. Some display assemblies also are able to sense the pressure of the stylus on the screen to provide further information to the central processing unit. When operating as an output device, the display assembly presents computer generated images on the screen.

This dual function in pen-based computer system permits a user to operate the computer as a computerized notepad. As the computer senses the position and movement of the stylus, the computer generates a corresponding image on the screen to create the illusion that the stylus is drawing the image directly on the screen. With suitable recognition software, text and numeric information also can be entered into the pen-based computer in a similar fashion. Additionally, these types of computers also may provide a number of useful functions, such as serving as an address book, an appointment calendar, and a to do list.

These types of computer systems, however, have a drawback when compared to more traditional computer systems, such as a personal desktop computer. One particular drawback is the size of the display. These displays are relatively small and can display only limited amounts of information. As a result, the amount of display space for displaying data and receiving user input is limited. If an input field is too small, a user will be unable to manipulate a stylus sufficiently to enter data. As a result, data entry may require traversing several screens or windows. By doing so, the logic or ease of use of an application may be reduced.

Therefore, it would be advantageous to have an improved method and apparatus for displaying data and receiving user input in a computer.

SUMMARY OF THE INVENTION

The present invention provides a method and apparatus in a data processing system for processing user input. A graphical widget is displayed on a display device within the data processing system, wherein the graphical widget is displayed using a first size. Responsive to receiving a selected user input, a display of the graphical widget is resized on the display device to a second size for receiving user input, wherein the second size is larger than the first size.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
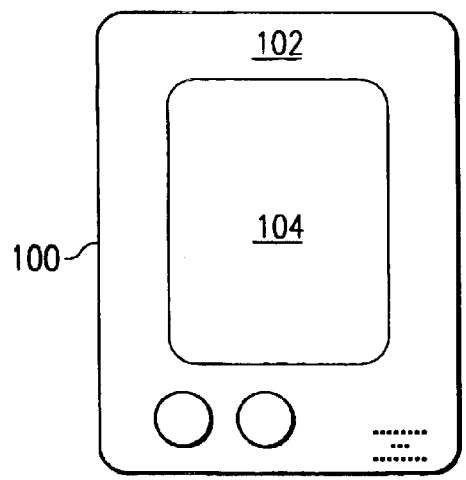
FIG. 1 is a diagram illustrating a computer in the form of a personal digital assistant depicted in which the processes of the present invention may be implemented.

With reference now to the figures and, in particular, with reference to FIG. 1, a diagram illustrating a computer in the form of a personal digital assistant is depicted in which the processes of the present invention may be implemented. Computer 100 is an example of a personal digital assistant (PDA). PDA 100 in the depicted examples is a portable personal computer in which housing 102 includes a screen 104. Screen 104 in this example is a touch responsive screen including a mechanism for selecting or designating a location on the surface of screen 104 in response to a pointer being placed on the surface of screen 104. As used herein, a reference to a "pointer" may be to either a stylus or a graphical pointer manipulated by a pointing device, such as a mouse or trackball.

Essentially, screen 104 comprises data panels placed either on the display surface or between the user and the display surface. Additionally, PDA 100 also provides ports and connectors (not shown) for power and serial access to its system board. Additionally, PDA 100 also may include a mechanism to receive PC cards, such as a modem or flash memory, for additional functionality.

Figure 2:
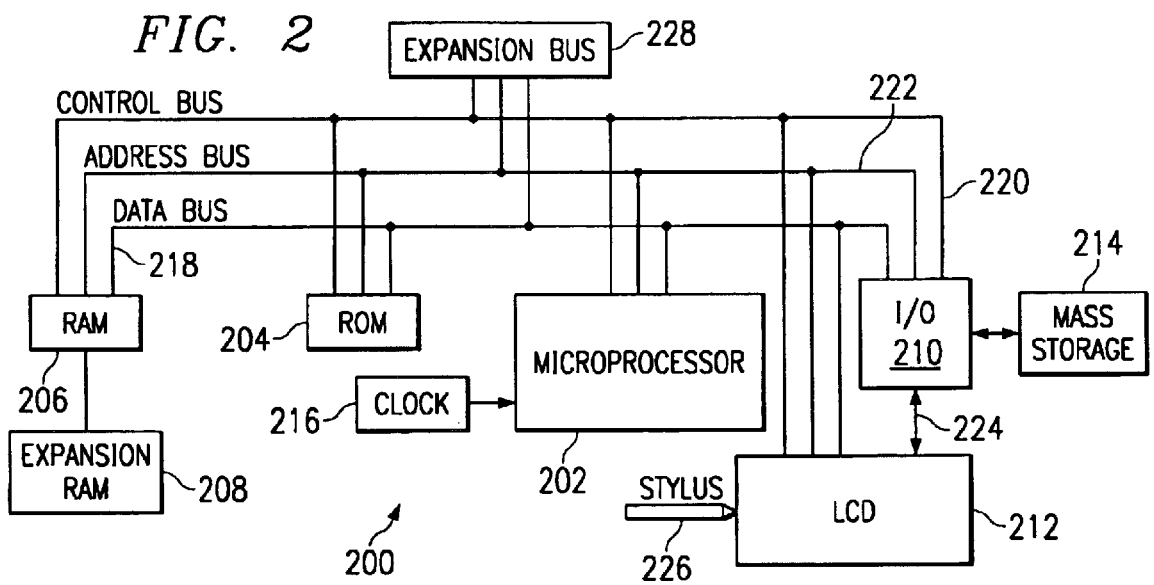
FIG. 2 is a block diagram of a personal digital assistant depicted in accordance with a preferred embodiment of the present invention.

Turning now to FIG. 2, a block diagram of a personal digital assistant is depicted in accordance with a preferred embodiment of the present invention. Personal digital assistant (PDA) 200 includes a processing unit 202, a read only memory (ROM) 204, random access memory (RAM) 206, expansion ram 208, input/output (I/O) circuitry 210, and display 212. PDA 200 also may optionally include a mass storage unit 214, such as a disk drive unit or a non-volatile memory such as a flash memory and a real time clock 216.

Processor 202 is preferably a commercially available single chip microprocessor and preferably a complex instruction set chip (CISC). Of course, other types of processors may be employed depending on the implementation. In this example, processor 202 is coupled to ROM 204 by a data bus 218, a control bus 220, and an address bus 222. ROM 204 contains the basic operating system for PDA 200 in these examples. Processor 202 is also connected to RAM by data bus 218, control bus 220, and address bus 222 to permit the use of RAM 206 as a scratch pad or storage for data. RAM 208 is optionally coupled to RAM 206 for use by processor 202. Processor 202 also is coupled to I/O circuitry 210 by data bus 218, control bus 220, and address bus 222 to permit data transfers with peripheral devices.

I/O circuitry 210 typically includes the number of latches, registers, and direct memory access (DMA) controllers. The purpose of I/O circuitry 210 is to provide an interface between processor 202 and peripheral devices, such as display assembly 212 and mass storage unit 214.

Display assembly 212 in PDA 200 is both an input and output device in these examples. Accordingly, display assembly 212 is connected to I/O circuitry 210 by a bi-directional data bus 218. Operating as an output device, display assembly 212 receives data from I/O circuitry 210 via data bus 218 and displays that data on a suitable screen. The screen for display assembly 212 is, in these examples, a liquid crystal display (LCD). The input device of display assembly 212 can be a thin, clear membrane covering the LCD display and which is sensitive to the position of a stylus, such as stylus 226 on its surface. Alternatively, the screens may be provided with an embedded radio frequency (RF) digitizer and an "active" RF stylus. Of course, other types of combinations of screen/tablet technologies may be employed.

Additionally, other types of user inputs may be used in conjunction with the present invention. While the processes are described with reference to the context of a pen system, other types of pointing devices may benefit from the processes of the present invention. These types of pointing devices include, for example, a mouse, a trackball, or a tablet to manipulate a pointer displayed on the screen.

A mass storage device, such as mass storage unit 214, is generally desirable, but may be eliminated by providing a sufficient amount of RAM 206 and expansion RAM 208 to store user application programs and data. In such a case, RAM 206 and RAM 208 may be provided with a backup battery to prevent loss of data even when PDA 200 is turned off. It is generally desirable, however, to have an additional mechanism for long term storage, such as mass storage unit 214. Mass storage unit 214 may take different forms, such as, for example, a miniature hard disk drive, or some other non-volatile memory, such as, for example, a flash memory, a battery backed RAM, or a PC data card.

In operation, information is entered into PDA 200 by a user manipulating stylus 226 to "write" on the screen of display assembly 212. Information concerning the location of stylus 226 is sent to processor 202 via I/O circuitry 210. Typically, this information comprises Cartesian coordinates of a pixel of the screen display assembly 212 over which the tip of stylus 226 is positioned. Processor 202 processes the data under the control of an operating system and possibly an application program stored in ROM 204 or in RAM 206 and RAM 208. Data may be produced in response to this user input by processor 202, which is then output on display 212.

Additionally, expansion bus 228 is coupled to data bus 218, control bus 220, and address bus 222. In this manner, expansion bus 228 may provide extra ports to couple devices, such as a modem, a display switch, a microphone and a speaker to processor 202.

Figure 3:
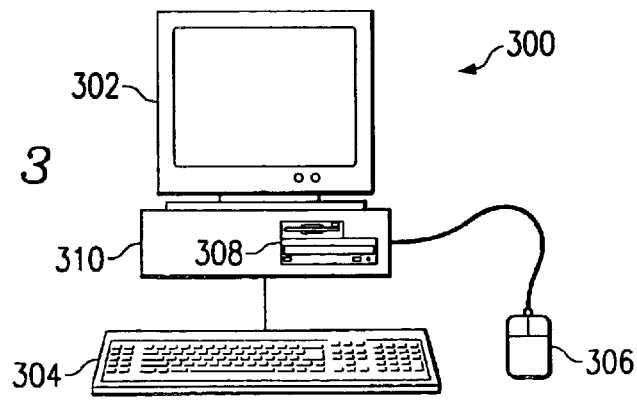
FIG. 3 is a pictorial representation depicting a data processing system in which the present invention may be implemented in accordance with a preferred embodiment of the present invention.
Figure 4:
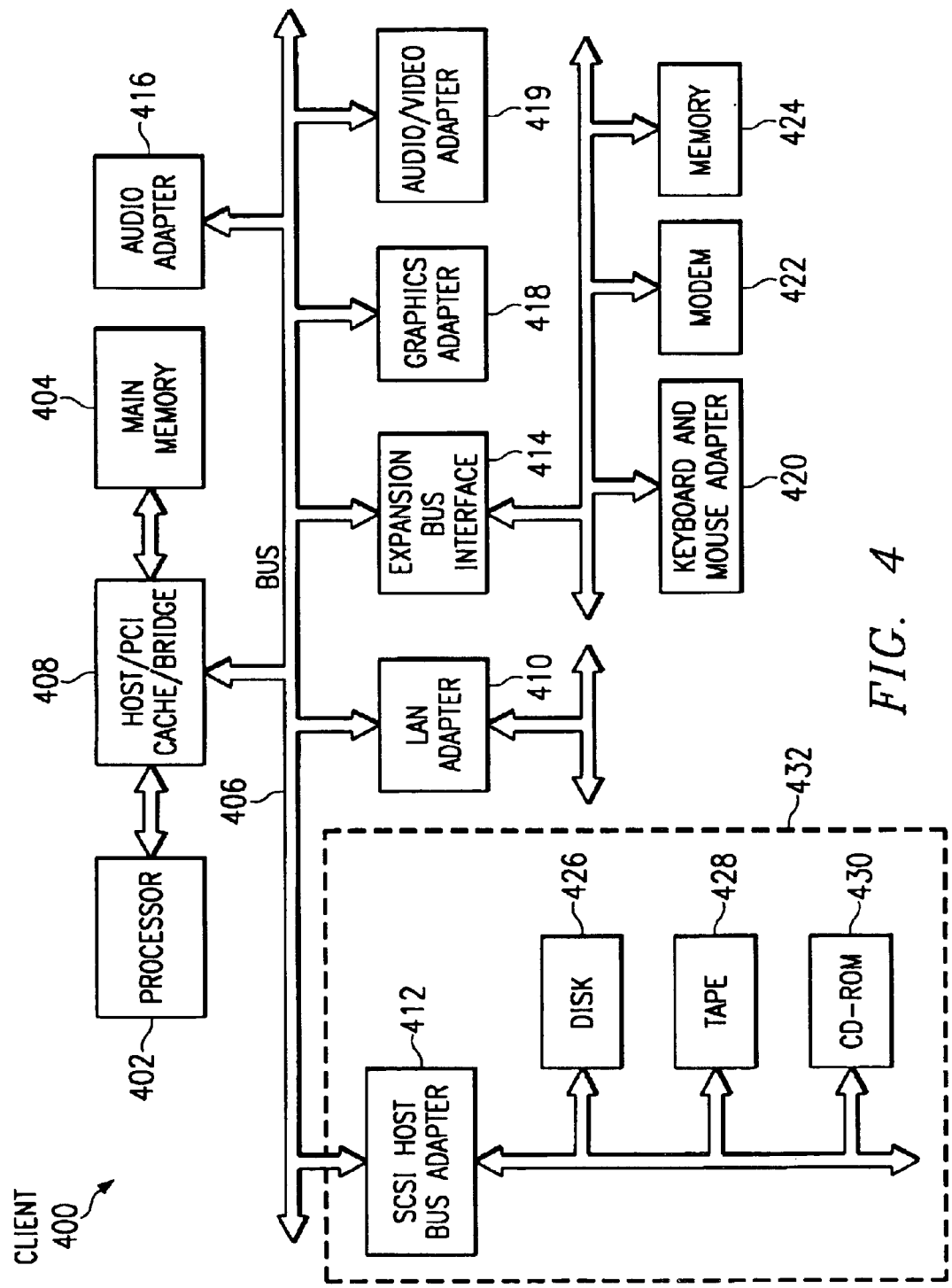
FIG. 4 is a block diagram illustrating a data processing system in which the present invention may be implemented.

With reference now to the FIGS. 3 and 4, in particular, with reference to FIG. 3, a pictorial representation of a data processing system is shown in which the present invention may be implemented in accordance with a preferred embodiment of the present invention. A personal computer 300 is depicted which includes a system unit 310, a video display terminal 302, a keyboard 304, storage devices 308, which may include floppy drives and other types of permanent and removable storage media, and mouse 306. Additional input devices may be included with personal computer 300. Personal computer 300 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 300 also preferably includes a graphical user interface that may be implemented by means of systems software residing-in computer readable media in operation within computer 300.

With reference now to FIG. 4, a block diagram illustrates a data processing system in which the present invention may be implemented. Data processing system 400 is an example of a computer, such as computer 300 in FIG. 3, in which code or instructions implementing the processes of the present invention may be located. Data processing system 400 employs a peripheral component interconnect (PCI) local bus architecture. Although the depicted example employs a PCI bus, other bus architectures such as Micro Channel and Industry Standard Architecture (ISA) may be used. Processor 402 and main memory 404 are connected to PCI local bus 406 through PCI bridge 408. PCI bridge 408 also may include an integrated memory controller and cache memory for processor 402.

Additional connections to PCI local bus 406 may be made through direct component interconnection or through add-in boards. In the depicted example, local area network (LAN) adapter 410, small computer system interface SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 400. "Java" is a trademark of Sun Microsystems, Inc. Instructions for the operating system, the object-oriented operating system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

The depicted example in FIG. 4 and above-described examples are not meant to imply architectural limitations. For example, data processing system 400 also may be a notebook computer or hand held computer. Data processing system 400 also may be a kiosk or a Web appliance.

Within a PDA, such as PDA 200 in FIG. 2 or a computer, such as computer 300 in FIG. 3, the present invention provides a method, apparatus, and computer implemented instructions for maximizing the efficiency of available display space. The mechanism of the present da invention may be used as an add on or hookup to existing window manager systems or function independently in the absence of a window manager. The mechanism of the present invention provides graphical widgets displayed on a screen. A graphical widget is a graphical input mechanism that can be resized to allow easier user input. Input may be received by the graphical widget in its reduced form, but is more difficult. These graphical widgets are displayed in a predefined size and layout in these examples. These graphical widgets are small in size and not typically suitable for user input, but when selected or tapped, a graphical widget will increase or grow in size to a preprogrammed percentage of the size of the screen and display a small "return" or "get back" graphical widget. This return widget is used to return the graphical widget to its original size. Alternatively, instead of selecting a return widget, the user may reselect the graphical widget to cause the graphical widget to be resized to the original size.

Also, instead of increasing the size of the widget to preprogrammed percentage of the screen, the widget may be increased in size to a selected size and layout. When in its expanded form, the graphical widget is of a size that allows the user to input data using a stylus. Further, the size may be of one that allows the user to be able to see text being entered. When the return widget is selected, the graphical widget is returned to its original size and layout. This return widget may be a graphical object, such as, for example, a small button displayed in association with the graphical widget. Otherwise, the processes of the graphical widget provide behavior as normally found in a typical window or other field for data entry.

For example, a user of a PDA desires to fill in a name and number in a contact list. The user may tap a name test field, which is a graphical widget, with a stylus. In response, the graphical widget will increase in size such that the user can more easily enter the name. When the user is finished, the user may select the return widget and have the name text field return to its original size and layout. In this manner, many fields for input may be placed on small screens, but still allow a user to easily interact with these graphical widgets. This mechanism allows a number of different input fields and controls to be displayed on a screen to allow a user to select from those input fields and controls without having to diverse multiple windows. Alternatively, the number of windows needing to be used may be reduced.

Figure 5A:
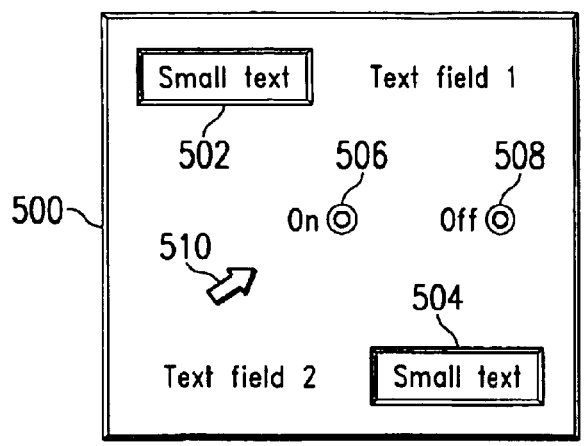
FIGS. 5A and 5B are diagrams illustrating an example of a graphical widget depicted in accordance with a preferred embodiment of the present invention.
Figure 5B:
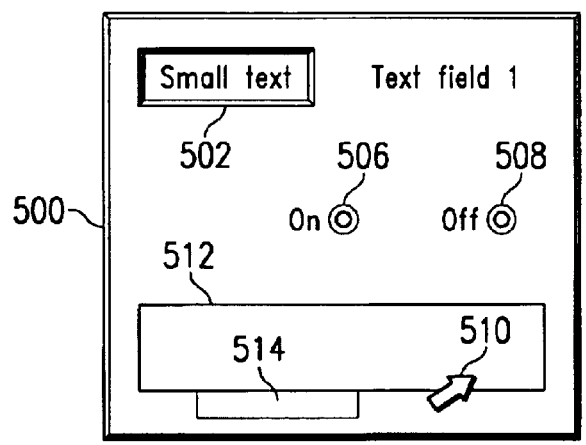

With reference now to FIGS. 5A and 5B, diagrams illustrating an example of a graphical widget are depicted in accordance with a preferred embodiment of the present invention. In FIG. 5A, display 500 includes small text field 502 and small text field 504. Additionally, display 500 also includes a radio button 506 and a radio button 508. In these examples, small text field 502 and small text field 504 are graphical widgets, which may be resized to allow for easier user input through pointer 510.

By selecting or tapping small text field 504 using pointer 510, small text field 504 expands to form text field 512 as shown in FIG. 5B. Text field 512 allows for a user to more easily input data. Text field 512 may be reduced back to small text field 504 by selecting return widget 514 using pointer 510. Alternatively, a selection of text field 512 may cause a return to the display of small text field 504 depending on the implementation. In the depicted examples, text could be entered by user into text field 504, but the size of text field 504 makes such entry difficult for a user. By having text field 504 "grow" or "snap" to the size for text field 512, a user is more easily able to enter data. Selection of small text field 504 results in a focus causing small text field to snap or grow on the screen to a "preferred" size as illustrated by text field 512. The snap or growth may be in an animated fashion such that the use can easily track the field.

Figure 6A:
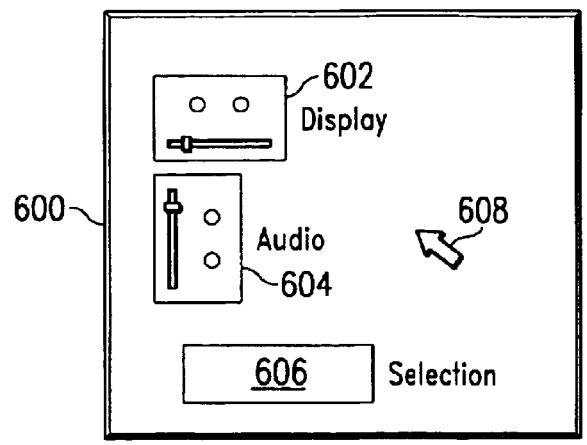
FIGS. 6A–6C are diagrams illustrating a graphical widget in the form of controls depicted in accordance with a preferred embodiment of the present invention.
Figure 6B:
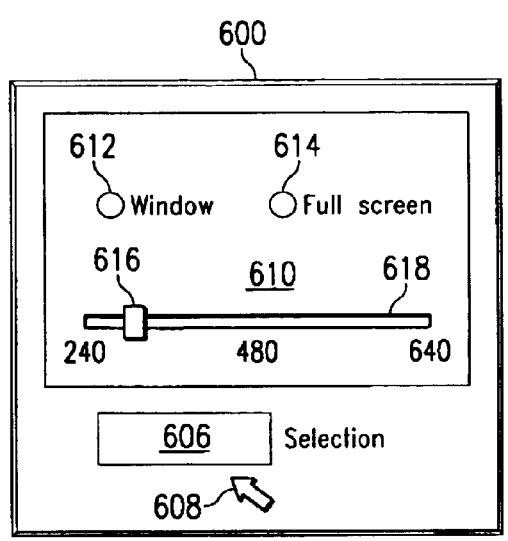
Figure 6C:
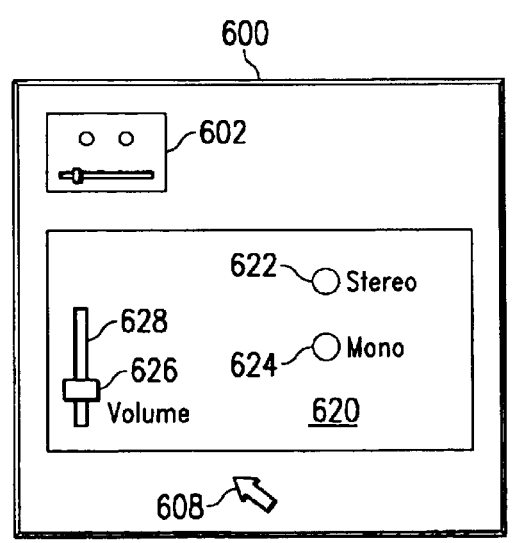

With reference now to FIGS. 6A–6C, diagrams illustrating a graphical widget in the form of controls, are depicted in accordance with a preferred embodiment of the present invention. In FIG. 6A, display 600 includes a display control 602, and audio control 604, and a selection field 606. In this example, display control 602, and audio control 604 are graphical widgets in accordance with a preferred embodiment of the present invention. Selection of one of these graphical widgets, such as display control 602 using pointer 608 results in display 602 growing in size to present display control 610 in FIG. 6B in which a user may make various selections. For example, the user may select window button 612 or screen button 614 to adjust display 600. Additionally, the display size may be adjusted using, slider 616 along scroll bar 618. Another selection of display control 610 results in the graphical widget returning to its original size as illustrated by display control 602 in FIG. 6A. Similarly, selection of audio control 604 in FIG. 6A results in audio control 620 being displayed in FIG. 6C. In this example, the audio may be set to "stereos" by selection of button 622 or to "mono" by selection of button 624. The volume may be adjusted by manipulating slider 626 in scroll bar 628 using pointer 608.

In these examples, display control 610 and audio control 620 are enlarged versions of display control 602 and audio control 604 in which the controls are increased in size by some selected percentage. Although the user could manipulate display control 602 or audio control 604 in its reduced size, the resized versions, display control 610 and audio control 620, allow for easier manipulation by a user when display space is limited. This proportional change allows a user to easily track control as it changes size. The size of display control 610 and audio control 620 are selected such that a user may more easily manipulate the controls.

Figure 7:
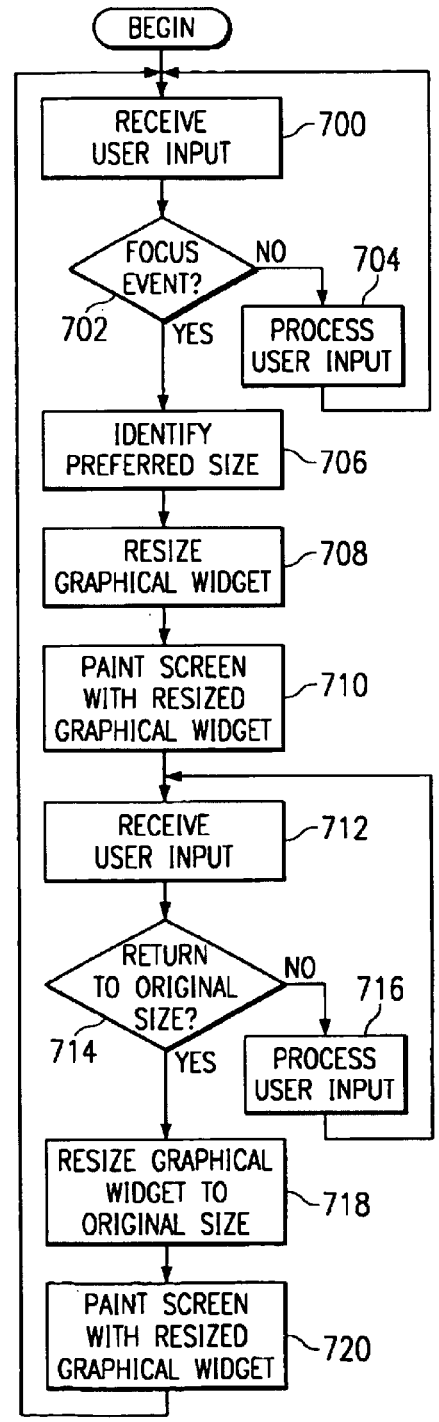
FIG. 7 is a flowchart of a process for handling input to a graphical widget depicted in accordance with a preferred embodiment of the present invention.

With reference now to FIG. 7, a flowchart of a process for handling input to a graphical widget is depicted in accordance with a preferred embodiment of the present invention. These processes may be implemented as an add on to a window managing system. Alternatively, the processes may be implemented in a single unified window manager in an operating system.

The process begins by receiving user input (step 700). Thereafter, a determination is made as to whether the user input is a focus event (step 702). If the user input is not a focus event, the input is processed (step 704) with the process then returning to step 700. Otherwise, if the user input is a focus event, a preferred size is identified for the graphical widget (step 706). In the depicted examples, this preferred size is some percentage of the original size of the graphical widget. The exact percentage change is determined based on the available display area and the size needed for a user to easily input data into the graphical widget. After the preferred size is identified, the graphical widget is resized (step 708) and the screen is painted with the resized graphical widget (step 710). Of course, the repainting may include an animation to show the "growth" or "snapping" of the graphical widget from the original size to the new size.

Thereafter, the process receives user input to the display (step 712). Upon receiving user input, a determination is made as to whether the input is a size trigger event that returns the graphical widget to the original size (step 714). If the user input is not one to return the graphical widget to the original size, the user input is processed (step 716) with the process then returning to step 712. Otherwise, the graphical widget is resized to the original size (step 718). Then, the screen on the display is repainted with the resized graphical widget (step 720) with the process then returning to step 700 as described above.

In the depicted examples, in resizing the widget to a preferred size, the resize or return widget may be optionally displayed in association with widget to return the size trigger event. Alternatively, the size trigger event may be caused by a reselection of the graphical widget by the user.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the processes of the present invention may be applied to provide graphical widgets for use in other types of data processing systems, such as, for example, a digital versatile disk (DVD) player system in which menus are displayed to a user on a screen, such as a television. In such a system, various fields may be presented using graphical widgets in which a pointer controlled by a remote control for the DVD player may be used to input and select information for use in controlling the DVD player. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing user input, the method comprising the data processing system implemented steps of:

displaying a first graphical widget on a display device within the data processing system, wherein the first graphical widget is displayed using a first size;

responsive to receiving a selected user interaction on the first graphical widget, displaying, using a second size, a second graphical widget on the display device in association with the first graphical widget for receiving user input, wherein the second size is larger than the first size; and responsive to receiving a user input in the second graphical widget removing the second graphical widget from the display device and inserting the user input into the first graphical widget.

2. The method of claim 1, wherein the first graphical widget is configured to receive user input.

3. The method of claim 1, wherein the second size is a percentage of the first size.

4. The method of claim 1, wherein the first graphical widget is one of a text field for receiving user input and a graphical control.

5. The method of claim 1, further comprising:

displaying a third graphical widget on the display device in association with the second graphical widget, and wherein the third graphical widget is not part of the second graphical widget; and responsive to receiving a user input in the third graphical widget, removing the second graphical widget from the display device and inserting the user input into the first graphical widget.

6. The method of claim 1, wherein the data processing system is one of a personal digital assistant, a personal computer, and a laptop computer.

7. The method of claim 3, wherein the percentage is determined based on an available display area of the display device and a size needed for a user to manipulate controls of the second graphical widget.

8. The method of claim 1, wherein the first displaying step, the second displaying step, and the removing step are implemented as one of an add on to a managing system of the data processing system and a single unified window manager in an operating system of the data processing system.

9. A method in a data processing system for processing user input, the method comprising the data processing system implemented steps of:

displaying an input field in a display in the data processing system, wherein the input field has a first size;

displaying a user input interface on the display, wherein the user input in interface has a second size, in response to a user interaction requiring a resizing of the input field, wherein the second size is larger than the first size; and responsive to receiving a user input in the user input interface, removing the user input interface from the display and inserting the user input into the input field.

10. The method of claim 9 further comprising:
receiving additional user input in the input field.

11. The method of claim 9, wherein the user interaction is a first user interaction and wherein the user input interface is removed responsive to a second user interaction at the completion of user input.

12. The method of claim 9, wherein the data processing system is one of a personal digital assistant and a portable computer.

13. The method of claim 9, further comprising:
displaying a return interface on the display, wherein the return interface is not part of the user input interface; and responsive to receiving a user input in the return interface, removing the user input interface from the display and inserting the user input into the input field.

14. A data processing system for processing user input, the data processing system comprising:
first displaying means for displaying a first graphical widget on a display device within the data processing system, wherein the first graphical widget is displayed using a first size;

second displaying means, responsive to receiving a selected user interaction on the first graphical widget, for displaying a second graphical widget on the display device, using a second size, in association with the first graphical widget for receiving user input, wherein the second size is larger than the first size; and first removing means, responsive to receiving a user input in the second graphical widget, for removing the second graphical widget from the display device and inserting the user input into the first graphical widget.

15. The data processing system of claim 14, wherein the first graphical widget is configured to receive user input.

16. The data processing system of claim 14, wherein the second size is a percentage of the first size.

17. The data processing of claim 14, wherein the graphical widget is one of a text field for receiving user input and a graphical control.

18. The data processing system of claim 14, further comprising:
third displaying means for displaying a third graphical widget on the display device in association with the second graphical widget, wherein the third graphical widget is not part of the second graphical widget; and second removing means, responsive to receiving a user input in the third graphical widget, for removing the second graphical widget from the display device and inserting the user input into the first graphical widget.

19. The data processing system of claim 14, wherein the data processing system is a personal digital assistant, a personal computer, and a laptop computer.

20. The data processing system of claim 16, wherein the percentage is determined based on an available display area of the display device and a size needed for a user to manipulate controls of the second graphical widget.

21. The data processing system of claim 14, wherein the first displaying means, the second displaying means, and the first removing means are implemented as one of an add on to a window managing system and a single unified window manager in an operating system.

22. A data processing system for processing user input, the data pressing system comprising:
first displaying means for displaying au input field in a display in the data processing system, wherein the input field has a first size; and second displaying means for displaying a user input interface on the display, wherein the user input interface has a second size, in response to a user interaction requiring a resizing of the input field, wherein the second size is larger than the first size; and first removing means, responsive to receiving a user input in the user input interface, for removing the user input interface from the display and inserting the user input into the input field.

23. The data processing system of claim 22, further comprising:
receiving means for receiving additional user input in the input field.

24. The data processing system of claim 22, wherein the user interaction is a first user interaction and wherein the user input interface is removed responsive to a second user interaction at the completion of user input.

25. The data processing system of claim 22, wherein the data processing system is one of a personal digital assistant and a portable computer.

26. The data processing system of claim 22, further comprising:
third display means for displaying a return interface on the display, wherein the return interface is not part of the user input interface; and second removing means, responsive to receiving a user input in the return interface, for removing the user input interface from the display and inserting the user input into the input field.

27. A computer program product in a computer readable medium for processing user input, the computer program product comprising:
first instructions for displaying a graphical widget on a display device within a data processing system, wherein the graphical widget is displayed using a first size; and second instructions, responsive to receiving a selected user input, for resizing a display of the graphical widget on the display device to a second size for receiving user input, wherein the second size is larger than the first size; and third instructions, responsive to receiving a user input in the second graphical widget, for removing the second graphical widget from the display device and inserting the user input into the first graphical widget.

28. A computer program product in a computer readable medium for processing user input, the computer program product comprising:
first instructions for displaying an input field in a display in a data processing system, wherein the input field has a first size; and second instructions for resizing the input field to a second size in response to a user input requiring a resizing of the input field, wherein the second size is larger than the first size; and third instructions, responsive to receiving a user input in the user input interface, for removing the user input interface from the display and inserting the user input into the input field.

* * * * *